United States Patent Office 3,026,744
Patented Mar. 27, 1962

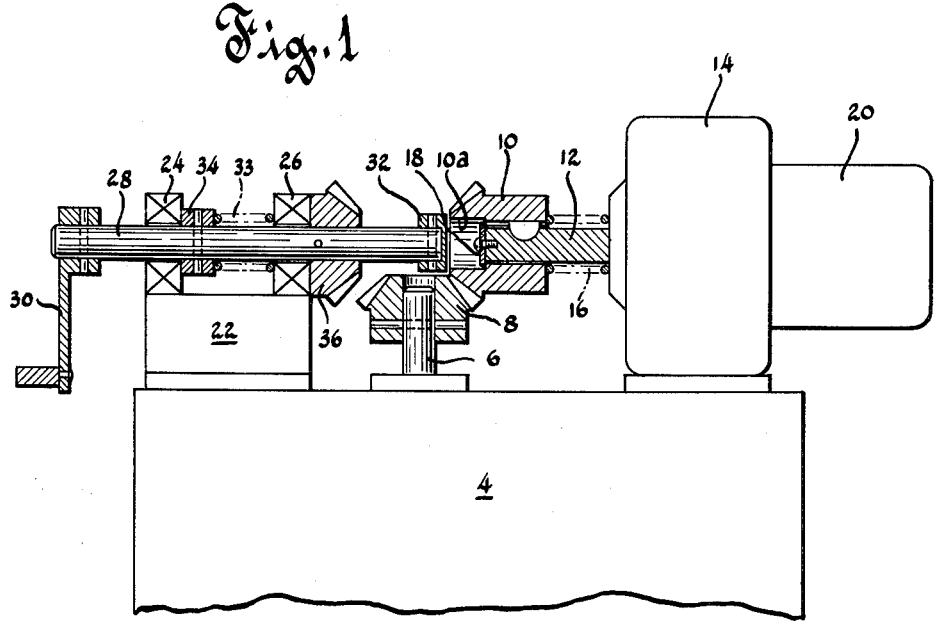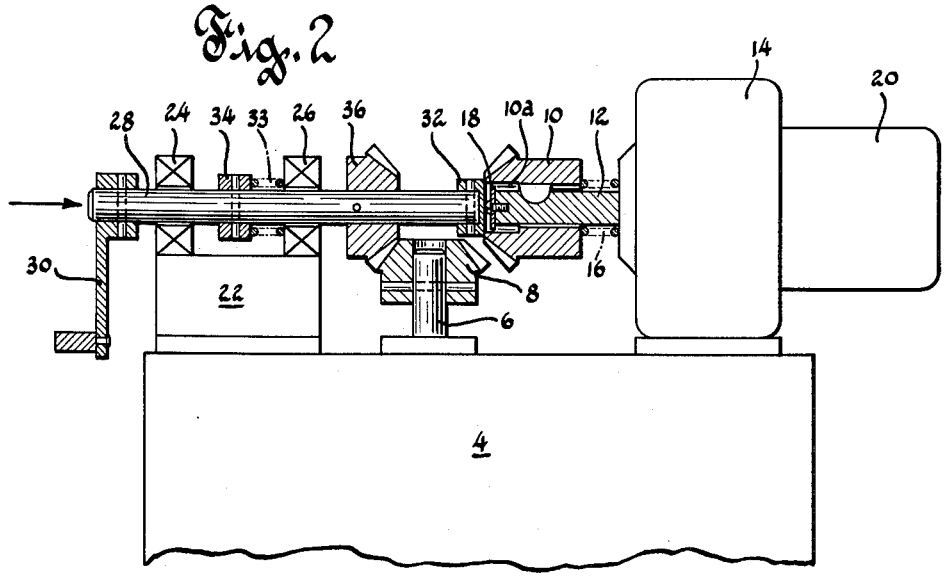

3,026,744
MOTOR OPERATED AND OVERRIDING MANUAL DRIVE FOR ROTATABLE SHAFT OPERATED DEVICES
William H. Rouse, Brookfield, Wis., assignor to Cutler-Hammer, Inc., Milwaukee, Wis., a corporation of Delaware
Filed July 14, 1960, Ser. No. 42,797
2 Claims. (Cl. 74—625)

This invention relates to a motor operated and overriding manual drive for rotatable shaft operated device.

Many devices having rotatable operating shafts, such as rheostats, large drum switches, sequencing switches and valves are provided with electric motor drives. Often it is desirable to manually operate such operating shafts for adjustments or servicing of the devices, or on occasions of failure of power supply to the driving motor. Auxiliary manually operable drives heretofore used have required either several actions or use of rather complicated coupling and uncoupling devices, and most cannot be used while the motor drive is in operation.

It is a primary object of the present invention to provide an improved drive system having both motor and manual drives, which by a single action can be rendered effective to complete manual drive connections and interrupt the motor drive connections.

Another object is to provide a drive system of the aforementioned type, in which the manual drive connections can be rendered effective and the motor drive connection interrupted even though the latter at the time is functioning to drive an operating shaft.

Other objects and advantages of the invention will hereinafter appear.

The accompanying drawings illustrate a preferred embodiment which will now be described, it being understood that the embodiment illustrated is susceptible of various modifications in respect of details without departing from the scope of the appended claims.

In the drawing:
FIGURE 1 is a side elevational view, partly in section, of apparatus incorporating the invention; and
FIG. 2 is like FIG. 1, but shows the apparatus in another operating condition.

In the drawing numeral 4 designates an enclosing case for some driven device (not shown) which, for example, could be a drum switch, potentiometer, or valve, or the like. The device has a rotatable operating shaft 6 extending outwardly of the top end of case 4 to which a bevel gear 8 is nonrotatably secured. Normally a bevel gear 10, which is nonrotatably and axially slidably mounted on the output shaft 12 of a reduction gear head 14 is in meshing engagement with gear 8. It is held in meshing engagement by a compression spring 16 concentrically mounted about shaft 12 and abutting at its opposite ends against the end of gear 10 and the adjacent end of the housing of gear head 14. A stop plate 18 secured to the end of shaft 12 abuts against the hollow wall of a recess 10a in gear 10 to limit axial movement of the latter to the left on shaft 12 for establishing its in-mesh position with gear 8.

An electric motor 20 is secured to the opposite end of gear head 14 and when energized may be assumed to drive the device mounted in case 4 at some suitable reduced speed through gear head 14, shaft 12, bevel gears 10 and 8 and shaft 6.

A bracket 22 mounted on the upper end of case 4 carries my novel overriding manually operable drive mechanism. This manual drive comprises spaced apart alined bearings 24 and 26, and a shaft 28 journaled in said bearings for rotational and axial movement in alined relation to the shaft 12. A crank handle 30 is nonrotatably fixed at one end of shaft 28, and a thrust bearing block 32 is secured to the opposite end of the latter. A coiled compression spring 33 concentrically mounted about shaft 28 and bearing at opposite ends against bearing 26 and an annular bearing block 34 fixed on shaft 28 serves to bias shaft 28 to the left-hand extreme position depicted in FIG. 1, wherein a bevel gear 36 nonrotatably fixed on shaft 28 is held in nonmeshing, but alined relation to gear 8.

If it is desired to manually operate the operating shaft 6, it is merely required that an operator push on the crank handle 30 to the right as viewed in the drawing. Shaft 28 will then axially slide to the right in bearings 24 and 26 to move gear 36 into mesh with gear 8, and through engagement of thrust block 32 with bevel gear 10 axially slides the latter on shaft 12 out of engagement with gear 8. With gear 36 in engagement with gear 8, and gear 10 out of engagement the operator can then rotate the operating shaft 6 as desired in either direction by appropriate rotation of shaft 28 through crank handle 30. The aforedescribed overriding manual operation of shaft 6 can be accomplished even though the latter at the time is being driven through operation of electric motor 20.

It will be apparent that upon release of crank handle 30, shaft 28 and gear 36 will return to their positions depicted in FIG. 1. Shaft 28 in moving back to such position permits gear 10, under the bias of spring 16 to again slide on shaft 12 into mesh with gear 8 to recomplete the electric motor driving connections to shaft 6.

I claim:
1. The combination with a device having a rotatable operating shaft with a gear fixed thereon, of a motor operated drive comprising a driving shaft, a gear nonrotatably but axially slidably mounted on said driving shaft and a spring biasing the driving shaft gear into mesh with the operating shaft gear, and a manual drive comprising a manually operable drive shaft, a gear fixed on said drive shaft and a spring normally biasing said drive shaft to a position holding its gear out-of-mesh with said operating shaft gear, said drive shaft being movable axially against the bias of the last mentioned spring to move its gear into mesh with said operating shaft gear and to concurrently move the driving shaft gear out-of-mesh with said operating shaft gear.

2. The combination according to claim 1 wherein said drive and driving shafts are axially alined and said operating shaft is disposed at a right angle thereto and wherein said gears are bevel gears.

References Cited in the file of this patent

UNITED STATES PATENTS

| | | |
|---|---|---|
| 1,133,318 | Rindfleisch | Mar. 30, 1915 |
| 1,248,850 | Aichele | Nov. 12, 1918 |
| 1,315,911 | Delage | Sept. 9, 1919 |
| 1,399,038 | Valois | Dec. 6, 1921 |

FOREIGN PATENTS

| | | |
|---|---|---|
| 613,129 | Great Britain | Nov. 23, 1948 |
| 942,570 | Germany | May 3, 1956 |